(12) United States Patent
Fritzsching et al.

(10) Patent No.: US 8,084,070 B2
(45) Date of Patent: Dec. 27, 2011

(54) ISOMALT IN CEREAL PRODUCTS

(75) Inventors: Bodo Fritzsching, Laudenbach (DE); Jörg Kowalczyk, Eisenberg/Steinborn (DE)

(73) Assignee: Sudzucker Aktiengesellschaft Mannheim/Ochsenfurt, Mannheim (DE)

( * ) Notice: Subject to any disclaimer, the term of this patent is extended or adjusted under 35 U.S.C. 154(b) by 602 days.

(21) Appl. No.: 11/817,962

(22) PCT Filed: Mar. 1, 2006

(86) PCT No.: PCT/EP2006/001855
§ 371 (c)(1),
(2), (4) Date: Dec. 3, 2007

(87) PCT Pub. No.: WO2006/094686
PCT Pub. Date: Sep. 14, 2006

(65) Prior Publication Data
US 2008/0193606 A1    Aug. 14, 2008

(30) Foreign Application Priority Data
Mar. 7, 2005    (DE) .......................... 10 2005 010 833

(51) Int. Cl.
*A23L 1/00* (2006.01)
(52) U.S. Cl. .......... 426/302; 426/307; 426/96; 426/658; 426/659
(58) Field of Classification Search .......................... None
See application file for complete search history.

(56) References Cited

U.S. PATENT DOCUMENTS

| | | | |
|---|---|---|---|
| 3,695,894 A * | 10/1972 | Hum | 426/241 |
| 4,497,840 A * | 2/1985 | Gould et al. | 426/560 |
| 4,622,891 A * | 11/1986 | Cramer et al. | 99/450.4 |
| 5,292,536 A | 3/1994 | Sato et al. | |
| 5,709,902 A * | 1/1998 | Bartolomei et al. | 426/620 |
| 6,139,886 A * | 10/2000 | Green et al. | 426/96 |
| 6,217,921 B1 * | 4/2001 | Lanner et al. | 426/103 |
| 6,414,138 B1 * | 7/2002 | Degelmann et al. | 536/124 |
| 6,458,400 B1 * | 10/2002 | Willibald-Ettle et al. | 426/548 |
| 6,475,540 B1 * | 11/2002 | Howling et al. | 426/94 |
| 6,548,095 B1 * | 4/2003 | Rapp et al. | 426/548 |
| 6,755,914 B2 * | 6/2004 | Ueno et al. | 127/29 |
| 2004/0013771 A1 * | 1/2004 | Funk et al. | 426/93 |

FOREIGN PATENT DOCUMENTS

| | | |
|---|---|---|
| DE | 4001069 | 7/1991 |
| DE | 19549645 | 12/2002 |
| DE | 10131782 | 1/2003 |
| DE | 10328180 | 1/2005 |
| EP | 0 434 025 | 9/1993 |
| EP | 0625578 | 11/1994 |
| WO | WO-0060954 | 10/2000 |
| WO | WO-02/21937 | 3/2002 |

OTHER PUBLICATIONS

Ms. Anette Radowski, China Food Additives, No. 2, pp. 48-53 (2000).

* cited by examiner

*Primary Examiner* — Humera N. Sheikh
*Assistant Examiner* — Felicia King
(74) *Attorney, Agent, or Firm* — Dickstein Shapiro LLP

(57) ABSTRACT

The present invention relates to cereal products comprising cereals and a mixture of 1,6-GPS and 1,1-GPM, methods for the production thereof and the use of a mixture comprising 1,6-GPS and 1,1-GPM for producing cereal products.

8 Claims, No Drawings

ISOMALT IN CEREAL PRODUCTS

The present invention relates to cereal products in coated and non-coated form, methods for producing coated and non-coated cereals and the use of a sugar alcohol mixture comprising 1,6-GPS (6-O-α-D-glucopyranosyl-D-sorbitol) and 1,1-GPM (1-O-α-D-glucopyranosyl-D-mannitol) for producing cereal products, wherein the mixture comprising 1,6-GPS and 1,1-GPM serves as a binding agent and/or as a component of a coating solution or a coating syrup.

Cereals, which is to say grain products, particularly made of corn, wheat, rice, oats, barley or rye, typically have vitamins, mineral nutrients and fiber and have established themselves as an important part of today's diet from a nutritional point of view. In general, they exert a favorable influence on the blood sugar level and cholesterol values and as a result serve to keep consumers healthy.

For example, from EP 0 434 025 B1 cereals in the form of crispies are known. Crispies are extruded products made from one or more types of flour or also from puffed cereal grains, which are produced while adding sugar and further flavor-enhancing components. This European patent specification provides recipes and methods for producing crispies with improved nutritional properties. This is achieved by providing saccharose-free crispies, which comprise polyols or sugar alcohols such as sorbitol, mannitol, xylitol, maltitol, lactitol or isomalt as a sugar substitute.

U.S. Pat. No. 6,475,540 B1 discloses cereals in which saccharose, which is usually present, has been partially or completely replaced with tagatose or mixtures of tagatose and polyols such as sorbitol, maltitol, isomalt, erythritol, xylitol, lactitol or hydrogenated corn syrup.

It is the technical object of the present invention to provide cereal products, which are largely free from common sugars not suited for diabetics, for example saccharose or glucose, but which can nonetheless be produced easily and cost-efficiently and are healthy organoleptic products. Furthermore, the inventive cereal products should not be distinguishable from the saccharose-based cereal products and should have an extended shelf life.

The object of the present invention is achieved by the provision of a cereal product, comprising a) cereals bonded by at least one binding agent and/or b) cereals having at least one coating, wherein the cereal product comprises 50 to 95 wt % (in relation to the total dry matter of the cereal product) cereals and 5 to 50 wt % (in relation to the total dry matter of the cereal product) of a mixture comprising 1,6-GPS and 1,1-GPM. The cereal products comprising 1,6-GPS and 1,1-GPM can therefore be provided with a coating comprising 1,6-GPS and 1,1-GPM and/or a binding agent comprising 1,6-GPS and 1,1-GPM.

The invention therefore provides for a cereal product, which comprises a substantial portion, which is to say 50 to 95 wt %, preferably more than 50 wt % to 95 wt %, particularly 60 to 95 wt %, 70 to 95 wt % or 80 to 95 wt % of cereals, with 90 wt % to 95 wt % being particularly preferred (in relation to the total dry matter of the cereal product), and in addition includes a quantity of 5 to 50 wt % (in relation to the total dry matter content of the cereal product) of a mixture comprising 1,6-GPS and 1,1-GPM.

In connection with the present invention, a mixture containing 1,6-GPS and 1,1-GPM shall encompass a mixture of the two sugar alcohols 1,6-GPS and 1,1-GPM, the mixture comprising these two sugar alcohols in any arbitrary ratio in relation to each other, substantially comprising this mixture or consisting of only this mixture. In a particularly preferred embodiment of the present invention, a mixture comprising 1,6-GPS and 1,1-GPM shall mean isomalt, which is to say a virtually equimolar mixture of 1,6-GPS and 1,1-GPM. In a further preferred embodiment, a mixture comprising 1,6-GPS and 1,1-GPM shall encompass isomalt GS, which is to say a mixture of 75 to 80 wt % of 1,6-GPS and 25 to 20 wt % of 1,6-GPM. In a further preferred embodiment, a mixture comprising 1,6-GPS and 1,1-GPM shall mean a mixture enriched with 1,6-GPS or 1,1-GPM, such as that described, for example, in DE 195 32 396 C2. Accordingly, a mixture enriched with 1,6-GPS is a mixture comprising more than 57 wt % to 99 wt % of 1,6-GPS and less than 43 wt % to 1 wt % of 1,1-GPM. Accordingly, a mixture enriched with 1,1-GPM is a mixture comprising more than 57 wt % to 99 wt % of 1,1-GPM and less than 43 wt % to 1 wt % of 1,6-GPS. A mixture comprising 1,6-GPS and 1,1-GPM, however, shall also mean a mixture comprising 1,6-GPS, 1,1-GPM and 1,1-GPS, such as that described, for example, in EP 0 625 578 B2.

In a particularly preferred embodiment, the invention provides for cereal products, which are made of a cereal core, particularly a core comprising cereals, and optionally preferably at least one binding agent and at least one coating that is applied to the core. In a particularly preferred embodiment, it may be provided that the mixture comprising 1,6-GPS and 1,1-GPM is present both in the core and in the coating. In a further embodiment, it may be provided that the mixture comprising 1,6-GPS and 1,1-GPM is present only in the core and not in the coating. In a further preferred embodiment, it may be provided that the mixture comprising 1,6-GPS and 1,1-GPM is present only in the coating and not in the core.

A further preferred embodiment provides for the mixture comprising 1,6-GPS and 1,1-GPM being the only added sugar alcohol or mixture thereof in the cereal product. A further preferred embodiment provides for the mixture comprising 1,6-GPS and 1,1-GPM being the only admixed volume-adding sweetening agent in the cereal product. A further preferred embodiment provides for the mixture comprising 1,6-GPS and 1,1-GPM being the only added sweetening agent in the cereal product. In a particularly preferred embodiment, the invention provides cereal products, which are free from saccharose, free from glucose or free from fructose, or free from mixtures of two or all of the above three sugars, for example free from invert sugar.

In connection with the present invention, the term "sweetening agent" shall encompass substances that have sweetening properties and are added, for example, to foodstuffs or beverages to create a sweetened taste. In connection with the present invention, the "sweetening agents" are divided into "sugars" such as saccharose, glucose or fructose, which provide volume and a sweetening effect, as well as "sweeteners", which is to say substances, which are not sugars, but still have a sweetening effect and which are in turn divided into "sugar substitutes", which is to say sweetening agents providing volume and a physiological calorific value, in addition to the sweetening effect (volume-adding sweeteners), and "intensive sweeteners", which is to say substances, which typically have a very high sweetening effect, but provide no volume and generally are calorie-free or low in calories.

In a particularly preferred embodiment, it is therefore provided that the mixture comprising 1,6-GPS and 1,1-GPM is the only added sweetening agent in the cereal product, which is to say that in addition to the mixture comprising 1,6-GPS and 1,1-GPM no sugars, no high-intensity sweeteners and no sugar substitutes and/or sugar alcohols have been added to the cereal product. The invention, however, may also provide for the mixture comprising 1,6-GPS and 1,1-GPM being the only volume-adding sweetening agent that is admixed to the cereal product, which is to say that other than the mixture comprising 1,6-GPS and 1,1-GPM, no sugars, no sugar alcohols and no sugar substitutes were admixed. In a further embodiment, it may be provided that the mixture comprising 1,6-GPS and 1,1-GPM is the only sugar alcohol or sugar alcohol mixture added to the cereal product, which is to say that no further sugar alcohols have been added.

In connection with the present invention, cereals shall mean grain products or grain replacement products, particularly granola, salty snacks, breakfast products or energy bars, which primarily comprise grain seeds, grain flakes, grain granules, grain extrudates, grain flour, grain powder, grain agglomerates or substitutes thereof, for example soy products such as soy beans, soybean flour, soy agglomerates, soy granules, soy extracts as well as soy powder, and in addition, at least one binding agent to bind these grain and/or soy products. The grain that is used can be wheat or durum wheat, spelt, rye, oats, corn, barley, rice, sorghum, millet, triticale, buckwheat, amaranth, quinoa or the like, such as soy.

In a preferred embodiment of the present invention, a mixture comprising 1,6-GPS and 1,1-GMP is used as the binding agent for the cereals.

In a particularly preferred embodiment, the cereal products of the present invention include 5 to 50 wt % (in relation to the total dry matter of the cereal product), particularly 10 to 35 wt % (in relation to the total dry matter of the cereal product), and preferably 20 to 30 wt % (in relation to the total dry matter of the cereal product) of a mixture comprising 1,6-GPS and 1,1-GPM, wherein the mixture comprising 1,6-GPS and 1,1-GPM in a first preferred embodiment is present only in the core, in a second preferred embodiment only in the coating and in a third preferred embodiment both in the core and in the coating.

In a particularly preferred embodiment, the cereal product of the present invention therefore includes the mixture comprising 1,6-GPS and 1,1-GPM either only in the coating or in the coating and the core.

In the core, the mixture comprising 1,6-GPS and 1,1-GPM acts as a binding agent and as volume-adding sweetening agent, in the coating it acts as a coating agent and volume-adding sweetening agent.

In a further preferred embodiment it is provided that the coating of the cereal product is made substantially of or substantially includes the mixture comprising 1,6-GPS and 1,1-GPM. According to the invention, it may be provided in a particularly preferred embodiment that the coating of the cereal product comprises 10 to 100 wt %, preferably 20 to 90 wt %, and particularly 30 to 80 wt % of the mixture comprising 1,6-GPS and 1,1-GPM (each in relation to the total dry matter of the coating). In one embodiment of the present invention, a plurality of layers may be provided, wherein the layers may be identical to or different from each other with respect to their composition and method of application. In a preferred embodiment, the dry matter portion of the coating in the total cereal product may amount to 0 to 50 wt %, preferably 2 to 40 wt %, more preferred 5 to 30 wt %, and particularly 10 to 25 wt %, each in relation to the dry weight of the cereal product.

In a particularly preferred embodiment, the invention provides for the cereal products comprising at least one additive in the core and/or in the coating.

In connection with the present invention, additives shall be understood as substances, such as those which are added to the inventive cereal products other than the mixture comprising 1,6-GPS and 1,1-GPM and the cereals. Accordingly, additives are optionally used substances and the invention encompasses both inventive cereal products comprising these substances or a selection thereof and cereal products comprising none or not all of the aforementioned additives. The use of additives can be selected individually as a function of the field of application and the requirements of the markets and consumers.

In connection with the present invention, an additive shall encompass, for example, a prebiotic, which advantageously positively affects the nutritional properties of the cereal product, a high-intensity sweetener, a sugar or a sugar substitute, which influence the sweetening effect of the cereal product, a fatty component or a dairy or milk product, which particularly influence the type and flavor of the end product, or a supplement.

Supplements shall be understood as those substances, which particularly affect the appearance, flavor, organoleptic properties, nutritional value, nutritional properties, processability, shelf life or readiness for use of the cereal product.

In a further preferred embodiment, it is also provided that at least one additive is a prebiotic, preferably inulin, oligofructose, resistant starch, $\beta$-glucan or galactooligosaccharide.

In the context of the present invention, a prebiotic shall mean an additive, which selectively stimulates the growth and/or activity of specific bacteria in the human or animal digestive tract, particularly bifidobacteria and/or *lactobacilli* such that beneficial health effects are to be expected or occur.

In the context of the present invention, a "probiotic" shall mean a live microbial additional component, which promotes the health of a person or animal consumer by stabilizing or improving the microbial composition in the digestive tract. Such probiotic microorganisms, which are used for example in foodstuffs, may be: Bifidobacteria such as the strains *B. adolescentis, B. animalis, B. bifidum, B. Iongum, B. thermophilum; Enterococcci, Lactobacilli* such as the strains *Lb. acidophilus, Lb. brevis, Lb, casei, Lb. cellobiosus, Lb. crispatus, Lb. delbrueckii* subsp. *Bulgaricus, Lb. fermentum, Lb. GG, Lb. johnsonii, Lb. lactis, Lb. plantarum, Lb. reuteri, Lb. rhamnosus, Lb. salivarius; Bacillus cereus toyoi; Bacillus cereus; Leuconostoc; Pediococcus acidilactici, Propionibacterium; Streptococci* such as the strains *S. cremoris, S. infantarius, S. intermedius, S. lactis, S. salivarius* subsp. *thermophilus* (see also Fuller, J. Appl. Bacteriol. (1989)). Preferred probiotics are bacteria of the *Lactobacillus* and *Bifidobacterium* species.

In the context of the present invention, "synbiotics" shall mean a mixture of at least one prebiotic and at least one probiotic, which promotes the health of the human or animal consumer by improving the survival rate and increasing the number of health-promoting live microbial organisms in the gastrointestinal tract, particularly by selectively stimulating the growth and/or metabolic activity of the microbial organisms.

In a further preferred embodiment, it is provided that at least one additive is a probiotic, preferably bifidobacteria or lactobacteria. Such probiotic bacterial cultures can preferably be dry cultures or permanent cultures. In a further preferred embodiment, it is provided that synbiotics, which is to say mixtures of probiotics and prebiotics, are used.

The invention also provides for at least one additive being a fatty component, for example cocoa mass, hydrogenated or non-hydrogenated vegetable oil or the like or, for example, a fat substitute.

In a further preferred embodiment, the invention provides for at least one additive to be a dairy or milk product, particularly a lactose-free milk product, for example skim milk powder, whole milk powder, lactose-free skim or whole milk powder, whey extract, or whey product. In this embodiment, it is preferable that the milk product be used in a quantity of 2 to 40 wt %, and preferably 5 to 20 wt % (in relation to the total weight of the cereal product). Particularly, in this last embodiment, it is preferable that the sugar alcohol mixture be used in a quantity of 20 to 50 wt % (in relation to the total weight of the cereal product).

In a further embodiment, it is provided that at least one additive is a sugar, for example saccharose, isomaltulose, glucose, fructose, maltose, lactose, rice starch, corn starch, potato starch, or a mixture of two or more of these substances.

In one embodiment, the invention also relates to inventive cereal products, which in addition to their content of at least 5 wt % of the mixture comprising 1,6-GPS and 1,1-GPM comprise sweeteners, for example sugar substitutes or high-intensity sweeteners.

In one embodiment of the invention, it is provided that the sugar substitute is, in particular, a sugar alcohol and is particularly selected from the group consisting of 1,1-GPS (1-O-α-D-glucopyranosyl-D-sorbitol), maltodextrin, lactitol, maltitol, erythritol, xylitol, mannitol, sorbitol, maltitol syrup, hydrogenated and non-hydrogenated starch hydrolysates and a mixture of two or more thereof.

In a further preferred embodiment, it is therefore provided that the coating of the cereal product also includes, in addition to the mixture comprising 1,6-GPS and 1,1-GPM, one or more polyol, for example sorbitol, maltitol, erythritol, xylitol, lactitol, mannitol or 1,1-GPS or a mixture thereof.

In a further preferred embodiment, it may therefore be provided, if the mixture comprising 1,6-GPS and 1,1-GPM is present in the core as a binding agent, this mixture is optionally combined with one or more polyols, for example sorbitol, maltitol, mannitol, 1,1-GPS, erythritol, xylitol or lactitol or a mixture thereof.

In a further preferred embodiment, it is provided that the high-intensity sweetener is selected from the group consisting of sucralose, sodium cyclamate, acesulfame potassium, neohesperidin dihydrochalcone, glycyrrhizin, stevioside, monellin, thaumatin, aspartame, dulcin, saccharin, naringin dihydrochalcone, neotame and a mixture of two or more thereof.

In a particularly preferred embodiment, the invention provides that at least one additive is a supplement and is selected from the group consisting of flavoring agents such as vanillin, dyes, flavor additives, mineral nutrients such as sodium or calcium, particularly salts such as sodium chloride, vitamins, folic acid, emulsifiers, lecithin, fiber, L-carnitine, omega 3 fatty acids, triglycerins of average chain length, phytoestrogens and ascorbic acid salts or a combination thereof.

According to the invention, it is further provided that the cereal product may also contain additional natural and/or synthetic dyes. Natural dyes may include, for example, dyes of plant origin such as carotenoids, flavonoids and anthocyans, dyes of animal origin such as cochineal, inorganic pigments such as titanium dioxide, iron oxide pigments and iron hydroxide pigments. Natural dyes likewise include secondarily formed dyes, for example enzymatic browning products such as polyphenols and non-enzymatic browning products such as melanoidines. According to the invention, it is further provided that products of heating, for example caramels and caramel coloring, may be used as natural dyes. In addition, synthetic dyes such as azo, triphenylmethane, indigoid, xanthene and quinoline compounds can be used for the inventive cereal products.

According to the invention, the inventive cereal products can additionally be enriched with natural or synthetic vitamins selected from the group consisting of vitamin A, vitamin $B_1$, vitamin $B_2$, vitamin $B_3$, vitamin $B_5$, vitamin $B_6$, vitamin $B_{12}$, vitamin B complex, vitamin C, vitamin D, vitamin E, vitamin F and vitamin K. The cereal products according to the invention may additionally comprise mineral nutrients and trace elements.

The cereal products preferably comprise at least one additive, which is selected from the group consisting of sweetening agents, rice starch, potato starch, corn starch, resistant starch, β-glucan, high-intensity sweeteners, flavoring agents, spices, dairy products, prebiotics, synbiotics, probiotics, cocoa-containing products, chocolate, fats, supplements, emulsifiers, food-grade acids, soluble and insoluble fibers such as inulin and oligofructose, stabilizers, vitamins, mineral nutrients, binding agents, dyes and preservatives.

In a particularly preferred embodiment, the present invention provides for the inventive cereal product comprising not only one, but a plurality of additives, for example two, three, four, five, six or more additives.

In a particularly preferred embodiment of the present invention, the cereals are present in untreated, extruded, cooked or puffed form.

The inventive cereals may be granola bars, energy bars and breakfast products, particularly clusters, granola, salty snacks, cornflakes, puffed corn, puffed rice, loops, balls, bite-sized pieces, flakes or crispies.

In a further preferred embodiment of the present invention, the invention relates to a method for producing a cereal product, particularly one of the type described above, comprising the following steps:
a) providing the cereals and at least one binding agent as well as optionally at least one additive,
b) bringing the cereals in contact with the binding agent and optionally with at least one additive, and
c) bonding the binding agent and optionally at least one additive with the cereals to form an agglomerate made of the cereals and binding agent and the optionally present additive, the binding agent consisting of, substantially consisting of or substantially comprising a mixture comprising 1,6-GPS and, 1-GPM, particularly in 30 to 100 wt %, 40 to 90 wt %, and preferably 50 to 80 wt % of the mixture comprising 1,6-GPS and 1,1-GPM (in relation to the total dry matter of the binding agent). In a preferred embodiment, the invention provides that the binding agent in step a) is present in the form of an aqueous binding agent solution or a binding agent syrup, for example with a dry matter content of 60-90%, and preferably 70-80%. Optionally, in addition to the mixture comprising 1,6-GPS and 1,1-GPM, at least one further bonding substance may be present in the binding agent, for example polydextrose. In a preferred embodiment, the step b) of bringing the cereal in contact with the binding agent may be performed by extruding.

In a further preferred embodiment, it is provided that the contact between the cereals and the binding agent according to step b) takes place particularly in the form of an aqueous solution of the binding agent at elevated temperatures, for example 70 to 110° C., and preferably 80 to 100° C. In a further preferred embodiment, subsequent to step c) the invention provides for performing a drying step of the resulting agglomerate, for example at 120 to 140° C.

In a further preferred embodiment, it is provided that the cereal product obtained in this way is selected from the group consisting of granola bars, energy bars, salty snacks and breakfast products, particularly flakes, loops, cornflakes, puffed corn, puffed rice, bite-sized pieces, balls, granola, crispies and clusters.

It is particularly preferred that the binding agent comprises at least one additive, which is selected from the group consisting of sweetening agents, high-intensity sweeteners, flavoring agents, spices, dairy products, prebiotics, synbiotics, probiotics, cocoa-containing products, chocolate, omega 3 fatty acids, L-carnitine, fats, resistant starch, β-glucan, corn starch, potato starch, rice starch, supplements, emulsifiers, food-grade acids, soluble and insoluble fibers such as inulin and oligofructose, stabilizers, vitamins, mineral nutrients, binding agents, dyes and preservatives.

In a further preferred embodiment of the invention, a method for producing a frosted or glazed cereal product is provided, particularly one of the kind mentioned above, the product comprising a core made of cereals and a coating such that, in one step of the method, i) a coating solution or a coating syrup or a coating melt is applied to the core, optionally while moving the core,
ii) the resulting coating is dried and
iii) a coated cereal product is obtained, the coating solution or the coating syrup consisting of, substantially consisting of or substantially comprising the mixture comprising 1,6-GPS and 1,1-GPM or the melt of the mixture comprising molten 1,6-GPS and 1,1-GPM present in aqueous media, at particularly 20 to 100 wt %, preferably 20 to 90 wt %, particularly 40 to 90%, and most preferably 50 to 80 wt % of the mixture comprising 1,6-GPS and 1,1-GPM, with 70 to 90 wt % (each in relation to the total dry matter of the coating solution or the syrup or the melt) of the mixture comprising 1,6-GPS and 1,1-GPM being particularly preferred. In a particularly preferred embodiment, the coating solution or the coating syrup or the coating melt may have a temperature of 70° C. to 180° C., particularly 80° C. to 110° C., and may therefore be used at this temperature for the coating process in step i). In a preferred embodiment of the present invention, the coating solution or syrup has a total dry matter content of preferably 70 to 90 wt % (in relation to the weight of the solution or the syrup).

In the case of highly concentrated solutions or melts of the mixture comprising 1,6-GPS and 1,1-GPM, for example those with a dry matter content of 90 to 100% (in relation to the total weight of the solution or the melt), in a preferred embodiment of the present invention, a temperature of 150 to 180° C., and particularly 155 to 170° C., may be provided for producing the melt or the solution, with the coating process in step i) preferably being conducted at or above a temperature of 135° C.

A core used in an inventive coating method may be produced, for example, by means of the above method according to the invention, and specifically one wherein a binding agent that includes a mixture comprising 1,6-GPS and 1,1-GPM is used. It may also be provided, however, that a cereal core is used, wherein the cereals are bonded with a binding agent of a different kind or composition.

In a further preferred embodiment, it may be provided that the cereal core for the coating is selected from extruded, cooked and puffed cereals, particularly loops, crispies, puffed rice, puffed corn, salty snacks, cornflakes, granola, bite-sized pieces, balls and clusters.

In a particularly preferred embodiment of the present invention, the coating from step ii) is dried at a temperature of more than 100° C., for example 120° C. to 130° C., and preferably 125° C. to 130° C., thus obtaining a glazed cereal product with a cereal core and a glassy amorphous coating (glazing). In a preferred embodiment, the glazing according to the invention may also be performed with a highly concentrated solution or melt of the type mentioned above.

In a particularly preferred embodiment, a method for producing a glazing as described above is provided, wherein subsequent to applying the amorphous coating and drying, the resulting cereal product is cooled, particularly while being moved.

In a particularly preferred embodiment, isomalt is used as the mixture comprising 1,6-GPS and 1,1-GPM for the production of the glazed cereal product.

In a further embodiment of the present invention, a method is preferred, according to which the coating in step ii) of the present sequence is dried at a temperature of less than 85° C., preferably 50 to 70° C., particularly 50 to 60° C., thus obtaining a frosted cereal product with a cereal core and a crystalline coating ("frosting"), wherein in a preferred embodiment the coated products are moved during the drying process in step ii). In a preferred embodiment of the present invention, the inventive "frosting" operation is performed with a coating solution or syrup that has a dry matter content of 70-90 wt % (in relation to the total weight of the solution or the syrup).

According to a further preferred embodiment, a mixture enriched with 1,6-GPM or 1,6-GPS, particularly isomalt GS is used as the sugar alcohol mixture comprising 1,6-GPS and 1,1-GPM for producing a frosted cereal product of the type described above.

In a further preferred embodiment, it is provided that the coating solution or the coating syrup or the coating melt comprises at least one additive. In a preferred embodiment of the present invention, this additive is selected from the group consisting of sweetening agents, corn starch, potato starch, rice starch, β-glucan, resistant starch, high-intensity sweeteners, particularly acesulfame potassium, sucralose, cyclamate, stevioside, neohesperidin dihydrochalcone, flavoring agents, spices, dairy products, prebiotics, synbiotics, probiotics, cocoa-containing products, chocolate, L-carnitine, omega 3 fatty acids, fats, supplements, emulsifiers, food-grade acids, soluble and insoluble fibers such as inulin and oligofructose, stabilizers, vitamins, mineral nutrients, binding agents, dyes and preservatives.

The invention further relates to the coated and non-coated products obtained with the inventive methods.

The invention also relates to the use of a mixture comprising 1,6-GPS and 1,1-GPM for producing cereal products of the kind referred to above, particularly as a binding agent and/or as a component of a coating solution or a coating syrup or a coating melt.

Further advantageous embodiments will be apparent from the dependant claims.

The invention will be explained in more detail on the basis of the following examples.

EXAMPLE 1

Production of Frosted, Coated Cereal Products with an Isomalt GS Solution

Cooked, puffed or extruded cereals, for example loops or balls, cornflakes or puffed rice, are heated in hot air at 80 to 95° C. and are added to a rotary drum.

An aqueous isomalt GS solution is prepared from 75% isomalt GS (75 to 80 wt % 1,6-GPS, 20 to 25 wt % 1,1-GPM) and 25% water, optionally while adding 0.05% acesulfame potassium or 0.02% sucralose (each in percent by weight, in relation to the total solution). This is done by mixing isomalt GS, optionally the high-intensity sweeteners, and water and heating the mixture to 100° C., so that all crystals are dissolved. The isomalt GS content is adjusted to a dry matter content of 76 to 79%. The resulting solution is adjusted to a temperature of 80 to 100° C. and is also maintained at this temperature in the subsequent coating process. To apply the coating solution to the cereals, 500 g of the produced isomalt GS solution is slowly added to 1000 g of cereals in the rotary drum. The coating process lasts 0.5 to 1 minute. The product is dried with dry, warm air at a temperature of 60 to 80° C. while being rotated in the rotary drum. After a drying time of approximately 10 minutes, the crystalline coating is substantially dry and appears completely white and crystallized. The product that is obtained is then cooled to room temperature before it is packaged.

EXAMPLE 2

Production of a Cereal Product with a Glazing of an Isomalt ST Solution

Cooked, puffed or extruded cereals, for example loops, balls, cornflakes or puffed rice, are heated in hot air at 80-95° C. and are added to a rotary drum.

An aqueous solution is produced from 70% isomalt ST (50% 1,1-GPM and 50% 1,6-GPS), 5% cocoa powder and 25% water, optionally with the addition of 0.05% acesulfame potassium or 0.02% sucralose (each in percent by weight, in relation to the total solution). This is done by mixing isomalt ST, optionally the high-intensity sweeteners, and water and heating the mixture to 105° C., so that all crystals are dissolved. The total dry matter content is adjusted to 80-82% (75-77% dry matter content of isomalt ST). The resulting solution is adjusted to a temperature of 80 to 100° C. and is also maintained at this temperature in the subsequent coating process. To apply the coating solution to the cereals, 500 g of the isomalt ST solution produced is slowly added to 1,000 g of cereals in the rotary drum. The coating process lasts 0.5 to 1 minute. The product is dried in a drying apparatus at a temperature of approximately 130° C. After approximately 10 to 15 minutes, the glazing is substantially dry, but still appears to be sticky. Consequently, the product obtained in this manner is cooled, while being moved, for 10 to 20 minutes with air at room temperature before it is packaged. The resulting product is not sticky.

EXAMPLE 3

Production of a Cereal Product with Glazing using a Highly Concentrated Isomalt ST Solution or Melt Cooked, puffed or extruded cereals, for example loops, balls, cornflakes or puffed rice, are heated in hot air at 80-95° C. and are added to a rotary drum.

An aqueous solution is produced from 75% isomalt ST and 25% water, optionally with the addition of 0.05% acesulfame potassium or 0.02% sucralose (each in percent by weight, in relation to the total solution). This is done by mixing isomalt ST, optionally the high-intensity sweeteners, and water and heating the mixture to 155 to 170° C., whereby a syrup or melt is obtained. The isomalt ST content is adjusted to a dry matter content of approximately 98%. Alternatively, isomalt ST can also be used to produce a melt when a suitable melting apparatus and a temperature that exceeds the melting point of isomalt ST are used. The resulting solution or melt is adjusted to a temperature of 135° C. and is also maintained at this temperature in the subsequent coating process. To apply the coating solution to the cereals, 500 g of the resulting isomalt ST solution is slowly added to 1000 g of cereal in the rotary drum, which has been heated to approximately 130° C. The coating process lasts 0.5 to 1 minute. Following coating, the product is removed from the rotary drum and cooled in a drying apparatus, while being moved, for 10 to 20 minutes with air at room temperature before it is packaged. The resulting product is not sticky.

EXAMPLE 4

Production of a Cereal Product using Isomalt ST as the Binding Agent

Formulation of the Binding Agent

| Components | % (percent by weight) |
|---|---|
| Isomalt ST | 60.00 |
| Inulin or oligofructose | 20.00 |
| Water | 20.00 |
| Total | 100.0 |

The binding agent may optionally comprise saccharose, up to 10% fat and/or up to 0.4% lecithin.

Formulation of the Cereals (Cereal Mixture):

| Components | % (percent by weight) |
|---|---|
| Nutri-Grain | 33.00 |
| Mini Crispies wheat bran | 22.00 |
| Coconut flakes | 11.00 |
| Hazelnut pieces | 34.00 |
| Total | 100.00 |

Production:

In a first step of the method, isomalt ST is mixed with inulin or oligofructose and this mixture is boiled with water, so as to produce a dry matter content of 80 to 82%. The binding agent produced in this way is mixed with the cereal mixture at a ratio of 20% binding agent and 80% cereal mixture (each in percent by weight) and rolled out. It is then dried in a dryer at 130° C. and cut into bars or broken into clusters and cooled before packaging.

The invention claimed is:

1. A method for producing a glazed cereal product comprising a core made of cereals and a coating, wherein
    a) the core is coated with a coating solution containing 20 to 100% by weight of a mixture comprising 1,6-GPS (6-O-α-D-glucopyranosyl-D-sorbitol) and 1,1-GPM (1-O-α-D-glucopyranosyl-D-mannitol), each in relation to the total dry substance of the coating solution, and having a temperature of 70° C. to 180° C., wherein the 1,6-GPS and 1,1-GPM, and optionally 1,1-GPS (1-O-α-D-glucopyranosyl-D-sorbitol), are the only volume-adding sweetening agents admixed to the cereal product,
    b) the resulting coating is dried at a temperature of 120° C. to 130° C.,
    c) subsequent to the drying step, the product is cooled while being moved, and
    d) a coated glazed cereal product comprising a cereal core and a glassy, amorphous coating is obtained.

2. A method according to claim 1, wherein the coating solution comprises at least one additive selected from the group consisting of sweetening agents, high-intensity sweeteners, flavoring agents, spices, dairy products, prebiotics, synbiotics, probiotics, cocoa-containing products, chocolate, omega-3 fatty acids, L-carnitine, fats, resistant starch, β-glucan, corn starch, potato starch, rice starch, supplements, emulsifiers, food-grade acids, soluble and insoluble fibers such as inulin and oligofructose, stabilizers, vitamins, mineral nutrients, binding agents, dyes and preservatives.

3. A method according to claim 1, wherein the cereal core is selected from the group consisting of extruded, cooked and puffed cereals.

4. A method according to claim 1, wherein the mixture comprising 1,6-GPS and 1,1-GPM is isomalt, isomalt GS, a mixture enriched with 1,6-GPS or a mixture enriched with 1,1-GPM.

5. A method according to claim 1, wherein the mixture comprising 1,6-GPS and 1,1-GPM further comprises 1,1-GPS (1-O-α-D-glucopyranosyl-D-sorbitol).

6. A cereal product, produced by a method according to claim 1, comprising cereals bonded by at least one binding agent or cereals comprising at least one coating or both, wherein the cereal product comprises 50 to 95% by weight, in relation to the total dry substance of the cereal product, of cereals and 5 to 50% by weight (in relation to the total dry substance of the cereal product) of a sugar alcohol mixture comprising 1,6-GPS and 1,1-GPM as the binding agent or coating or both, wherein the 1,6-GPS and 1,1-GPM, and optionally 1,1-GPS (1-O-α-D-glucopyranosyl-D-sorbitol), are the only volume-adding sweetening agents in the cereal product.

7. A cereal product according to claim 6, wherein at least one of the binding agent or coating comprises at least one additive selected from the group consisting of sweetening agents, high-intensity sweeteners, flavoring agents, spices, dairy products, prebiotics, synbiotics, probiotics, cocoa-containing products, chocolate, omega-3 fatty acids, L-carnitine, fats, resistant starch, β-glucan, corn starch, potato starch, rice starch, supplements, emulsifiers, food-grade acids, soluble and insoluble fibers such as inulin and oligofructose, stabilizers, vitamins, mineral nutrients, binding agents, dyes and preservatives.

8. A method according to claim 3, wherein the cereal core is selected from the group consisting of flakes, salty snacks, loops, crispies, puffed rice, puffed corn, bite-sized pieces, balls, cornflakes, clusters and granola.

* * * * *